Patented May 20, 1947

2,420,928

UNITED STATES PATENT OFFICE 2,420,928

DIALKOXYARYL TRICHLOROMETHYL METHANE COMPOUNDS AS INSECTICIDES

Euclid W. Bousquet, Wilmington, and Avery H. Goddin, Newark, Del., assignors to E. I. du Pont de Nemours & Company, Wilmington, Del., a corporation of Delaware No Drawing. Application June 2, 1943, Serial No. 489,380

23 Claims. (Cl. 167—30)

This invention relates to pest control and is particularly directed to methods and compositions for preventing or arresting infestations of insects and allied organisms as well as fungi and bacteria and like pestiferous microorganisms which commonly infest organic matter, whether plant or animal or of plant or animal origin, either in its natural, fabricated or synthetic state, which compositions and processes distinguish from the processes and compositions heretofore known in the use of ethers of a di(hydroxyaryl)-trichloromethyl methane.

The need and desirability of having a truly synthetic organic pest control agent has long been recognized in the art and much research has been carried out for the purpose of discovering such agents. That such research has been only partially effective in accomplishing its object is amply illustrated in the present emergency by our dependency upon imported materials such as rotenone products and pyrethrum products.

We have now found that control of noxious pests can be obtained by bringing them into contact with a toxic amount of an ether of di(hydroxyaryl) trichloromethyl methane.

The compounds according to the invention are readily synthesized by condensing one mol of chloral with 2 mols of a phenol or phenol ether in the presence of a suitable acidic condensing agent such as sulfuric acid, hydrochloric acid, aluminum trichloride or boron trifluoride. The etherification of the hydroxyl group may be effected either before or after condensation. If an ester such as phenyl acetate is used in the condensation it may rearrange by way of the Fries rearrangement to a hydroxy acetophenone. The phenol thus obtained may be condensed with chloral and the free hydroxyl etherified. By selection of a suitable phenol or ether or by etherification, as above noted, a wide variety of products such as di(para-methoxyphenyl)trichloromethyl methane, di(para-ethoxyphenyl)trichloromethyl methane, and di(para-methyl-orthomethoxyphenyl)trichloromethyl methane may be obtained.

The compounds of the invention may be represented by the general formula

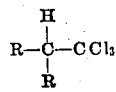

in which the radicals R are the radicals of an etherified monohydric phenol obtained by removing a nuclear hydrogen. The term "phenol" is used to designate the hydroxy benzenes.

The invention is particularly directed to compounds in which the hydroxyl group is etherified with a lower molecular weight aliphatic alcohol, such as methyl, ethyl, propyl, butyl and amyl alcohols, to give compounds having a molecular weight less than 460. The ethers constitute a class separate and distinct from the broad class because the free hydroxyl comprehended within the broad class tends to impart phytotoxic properties to the compound.

The compounds of the invention may be incorporated in various compositions according to the requirements of control of the particular pest involved. They should be incorporated in such compositions in a fine state of dispersion in a suitable carrier which may be a liquid or a finely divided solid. The dispersed particles should be less than 40 microns in size. If the carrier is an inert solid, particles of the carrier also should be less than 40 microns. The dispersion may be either a molecular dispersion, a micellar dispersion, or a physical dispersion. In the first of these the particles will be dispersed as molecules or ions, in the second as groups of molecules and in the third as discrete particles. There may be incorporated in these compositions, either in the form sold or in the form made up for application, various auxiliary materials such as spreaders, stickers, dispersing agents, flocculating agents and conditioning agents as more particularly set out below.

The invention may be more fully understood by reference to the following examples in which the parts are by weight unless otherwise specified.

Example 1

A solution of 1 part of di(para-methoxyphenyl)trichloromethyl methane in 100 volume-parts of acetone was thoroly mixed with 99 parts of talc to form a paste. The acetone was then evaporated with sufficient agitation to give a homogeneous dust. There is thus obtained a product suitable for dusting foliage for the control of various pests.

The proportions may be varied to give dust compositions containing greater or less of the active ingredient or the 1% dust thus obtained may be diluted with talc simply by mechanical mixture therewith to provide a more dilute dust.

In place of di(para-methoxyphenyl)trichloromethyl methane there may be substituted di(para-methyl-ortho - methoxyphenyl)trichloromethyl methane, and like products.

Example 2

80 parts of di(para-methoxyphenyl)trichloromethyl methane and 1 part of lauryl alcohol (Technical n-dodecyl alcohol) is dissolved in 100 volume-parts of acetone. This solution is thoroly mixed with 14 parts of tricalcium phosphate and five parts of bentonite and dried with sufficient agitation to give a homogeneous powder. This powder is dispersible in water for application to foliage as a spray for the control of insect pests.

The proportions may be varied to give a less concentrated product, though in compositions of this type as high a concentration as possible is desirable consistent with a dry, free-flowing powder. The composition may be varied in other particulars as more particularly set out in Patent 2,161,462.

In place of the active ingredient there may be substituted other materials, as more particularly set out in Example 1.

Example 3

Di(para-methoxyphenyl)trichloromethyl methane is dissolved in acetone to a concentration of 2.5% together with 0.25% of a wetting agent, known in the trade as IN-438, the active agent of which is the sodium salt of sulfated oleyl acetate. This composition is suitable for dispersing in water to provide a contact insecticide spray for the control of insect pests such as aphis.

The proportions may be varied to provide greater or lesser concentration of active ingredient and other solvents and other wetting agents may be employed. In place of the active ingredient there may be substituted other materials, as more particularly specified in Example 1.

Example 4

Di(para-methoxyphenyl)trichloromethyl methane is dissolved in a refined kerosene marketed under the name "Deobase" to a concentration of 2 per cent. This composition is suitable for the control of household insects and as a fly spray.

The concentration may be varied to provide a more dilute solution according to the degree of control required, and other toxicants may be substituted as more particularly set out in Example 1.

The toxicant may be replaced in part by pyrethrum in amounts up to 100 milligrams per 100 cc.

As illustrative of the high efficiency of the compounds of the invention the composition of this example when tested according to the Peet-Grady method gave 100% knock-down in 10 minutes and 100% kill in 24 hours as compared with 11% knock-down in 10 minutes and 2% kill in 24 hours for the Deobase-kerosene alone.

While the compounds of the invention are particularly useful as contact insecticides and as household insecticides they may be of assistance in preventing bacterial and fungal putrefaction of protein such as gelatine, glues, starches, paste, leather, cellulosic materials, casein products and other natural or manufactured products that are subject to attack or decomposition by various bacteria and molds. They may be useful also for the control of fungus diseases on leaves and living plants.

They may be used in various combinations with such auxiliary materials as spreaders, stickers, and other toxicants; for example, insecticides such as metallic arsenates, fluosilicates, phenothiazines, organic thiocyanates such as n-dodecyl thiocyanate, fenchyl thiocyano acetate and butyl carbitol thiocyanate, nicotine, anabasine (neo-nicotine), nor-nicotine, rotenone and its congeners, hellebore, pyrethrum, N-isobutyl-undecylenamide, aminomethyl sulfides, and bactericides and fungicides such as sulfur, polysulfides such as lime-sulfur, the chlorinated phenols, aminomethyl sulfides, copper acylacetonates, copper chelates of beta-keto acids and esters, copper chelates of salicylaldehyde, Burgundy mixture, Bordeaux mixture, the so-called insoluble coppers such as basic copper sulfates, copper oxychlorides, copper calcium chlorides, copper oxides, copper silicates, copper zeolites, and copper thiocyanates, the long chain quaternary ammonium halides and derivatives of dithiocarbamic acid such as ferric dimethyldithiocarbamate. They may be used in the form of aqueous sprays, dusts or solutions, dispersed with wetting agents such as the alkali metal or amine salts of oleic acid and the sulfated higher alcohols, the sulfonated animal and vegetable oils such as sulfonated fish or castor oils or the sulfonated petroleum oils; with diluents such as calcium phosphate, Bancroft clay, kaolin, diatomaceous earth, sulfur, lime pyrophyllite, talc, bentonite, flours such as walnut shell, wheat, redwood, soya bean, cottonseed, or with organic solvents such as trichloroethylene, tetrachloroethylene, Stoddard solvent, and other hydrocarbon solvents. They may be used in vegetable and mineral oil sprays in which petroleum or vegetable oil glycerides are used as contact agents or active poisons. Various adhesive and sticking materials such as rosin and glue and various other common adjuvants such as lime may be used. Such mixtures as are here set out may have particular usefulness in special applications and frequently will give better results than would be anticipated from the killing power or repellent action of each ingredient when used alone.

In general the active agents of this invention may be formulated in a wide variety of ways as may be best suited to the control of any particular pest or combination of pests having in mind the nature of the pest, its particular habitat and feeding habits and its peculiar susceptibilities, if any. Thus suitable compositions may be prepared with the active agent in a state of composition, subdivision, association with such other materials as have been mentioned, etc., such as may be necessary peculiarly to adapt the active agent to the purpose to be effected.

We claim:

1. A fly spray composition consisting essentially in a fly spray base hydrocarbon solvent containing a toxic amount of di(para-methoxyphenyl)-trichloromethyl methane.

2. The method of controlling insects which comprises contacting the insect with a toxic amount of di(para - methoxyphenyl)trichloromethyl methane.

3. The method of controlling insects which comprises contacting the insects with a toxic amount of di - (alkoxyphenyl)trichloromethyl methane having a molecular weight less than 460.

4. A fly-spray consisting essentially of fly-spray base hydrocarbon solvent and toxicant in which the toxicant contains as an essential active ingredient a di-(alkoxyphenyl)trichloromethyl methane having a molecular weight less than 460.

5. The method of controlling insects which comprises contacting the insects with a toxic amount of di(para-alkoxyphenyl)trichloromethyl methane having a molecular weight less than 460.

6. A fly-spray consisting essentially of fly-spray base hydrocarbon solvent and toxicant in which the toxicant contains as an essential active ingredient a di(para-alkoxyphenyl)trichloromethyl methane having a molecular weight less than 460.

7. An insecticidal composition comprising as an essential active ingredient a di(alkoxyaryl)trichloromethyl methane having a molecular weight less than 460, in which the aryl group is selected from the benzene series, in admixture with a material selected from the group consisting of a finely divided solid having a particle size less than 40 microns, a hydrocarbon solvent, a wetting agent, and a dispersing agent.

8. An insecticidal composition comprising as an essential active ingredient a di(para-alkoxyaryl)trichloromethyl methane having a molecular weight less than 460, in which the aryl group is selected from the benzene series, in admixture with a material selected from the group consisting of a finely divided solid having a particle size less than 40 microns, a hydrocarbon solvent, a wetting agent, and a dispersing agent.

9. An insecticidal composition comprising as an essential active ingredient a di(alkoxyphenyl)trichloromethyl methane having a molecular weight less than 460 in admixture with a material selected from the group consisting of a finely divided solid having a particle size less than 40 microns, a hydrocarbon solvent, a wetting agent, and a dispersing agent.

10. An insecticidal composition comprising as an essential active ingredient a di(para-alkoxyphenyl)trichloromethyl methane having a molecular weight less than 460 in admixture with a material selected from the group consisting of a finely divided solid having a particle size less than 40 microns, a hydrocarbon solvent, a wetting agent, and a dispersing agent.

11. An insecticidal composition comprising as an essential active ingredient di(para-methoxyphenyl)trichloromethyl methane in admixture with a material selected from the group consisting of a finely divided solid having a particle size less than 40 microns, a hydrocarbon solvent, a wetting agent, and a dispersing agent.

12. An insecticidal composition comprising di(para-methoxyphenyl)trichloromethyl methane as an essential active ingredient dispersed in a finely divided solid having an average particle size less than 40 microns.

13. An insecticidal composition comprising an aqueous emulsion containing di(para-methoxyphenyl)trichloromethyl methane as an essential active ingredient.

14. A fly spray consisting essentially of a fly spray base hydrocarbon solvent and a toxicant in which the toxicant contains as an essential active ingredient a di(alkoxyaryl)trichloromethyl methane having a molecular weight less than 460 and in which the aryl group is selected from the benzene series.

15. A fly spray consisting essentially of a fly spray base hydrocarbon solvent and a toxicant in which the toxicant contains as an essential active ingredient a di(para-alkoxyaryl)trichloromethyl methane having a molecular weight less than 460 and in which the aryl group is selected from the benzene series.

16. The method of controlling insects which comprises contacting the insects with a toxic amount of a di(alkoxyaryl)trichloromethyl methane having a molecular weight less than 460 and in which the aryl group is selected from the benzene series.

17. The method of controlling insects which comprises contacting the insects with a toxic amount of a di(para-alkoxyaryl)trichloromethyl methane having a molecular weight less than 460 and in which the aryl group is selected from the benzene series.

18. The method of destroying insects which comprises applying to the insects a composition an active toxic ingredient of which is dianisyl trichloroethane.

19. The method of controlling insects which comprises contacting the insect with a toxic amount of di(para-ethoxy-phenyl)trichloromethyl methane.

20. An insecticidal composition comprising as an essential active ingredient di(para-ethoxyphenyl)trichloromethyl methane in admixture with a material selected from the group consisting of a finely divided solid having a particle size less than 40 microns, a hydrocarbon solvent, a wetting agent, and a dispersing agent.

21. A fly spray composition consisting essentially in a fly spray base hydrocarbon solvent containing a toxic amount of di(para-ethoxyphenyl)trichloromethyl methane.

22. An insecticidal composition comprising di(para-ethoxyphenyl)trichloromethyl methane as an essential active ingredient dispersed in a finely divided solid having an average particle size less than 40 microns.

23. An insecticidal composition comprising an aqueous emulsion containing di(para-ethoxyphenyl)trichloromethyl methane as an essential active ingredient.

EUCLID W. BOUSQUET.
AVERY H. GODDIN.

REFERENCES CITED

The following references are of record in the file of this patent:

UNITED STATES PATENTS

| Number | Name | Date |
|---|---|---|
| 2,329,074 | Muller | Sept. 7, 1943 |

OTHER REFERENCES

Beilstein, 4th edition, vol. 6, page 1007.